United States Patent
Hans et al.

[15] 3,657,094
[45] Apr. 18, 1972

[54] DEVICE FOR MEASURING OXYGEN CONCENTRATION IN A METALLIC BATH

[72] Inventors: Andre Nicolas Hans, Waremme; Philippe Felix Catoul, Horion-Hozemont, both of Belgium

[73] Assignee: Centre Nationale de Recherches Metallurgiques, Brussels, Belgium

[22] Filed: Aug. 31, 1970

[21] Appl. No.: 68,208

[30] Foreign Application Priority Data

Apr. 7, 1970 Belgium .................................. 748,622
July 16, 1970 Belgium .................................... 42,919

[52] U.S. Cl. ........................... 204/195, 174/74 R, 204/1 T, 204/286, 204/297 R
[51] Int. Cl. ............................................... G01n 27/46
[58] Field of Search ............................ 204/1 T, 195

[56] References Cited

UNITED STATES PATENTS

| 3,098,813 | 7/1963 | Beebe et al. | 204/195 |
| 3,468,780 | 9/1969 | Fischer | 204/195 |
| 3,476,672 | 11/1969 | Snyder et al. | 204/195 |
| 3,481,855 | 12/1969 | Kolodney et al. | 204/195 |

*Primary Examiner*—T. Tung
*Attorney*—Holman & Stern

[57] ABSTRACT

The device is a probe comprising a measurement cell detachably connected to a holder. The holder has three electrically conductive co-axial tubes separated by insulating spacers. The cell has a heat resistant sheath which receives the external tube of the holder. Received within the sheath is a housing having a cavity which extends through it and receives the central tube of the holder. A hollow tube held by the housing contains an electrode, a thermo-couple, and a layer of powdery material providing thermal contact between the thermo-couple junction and the housing. Three contact elements are respectively connected to the two thermo-couple leads and another electrode, and make respective electrical contact with the central, intermediate, and external tubes of the holder.

Figure 3:
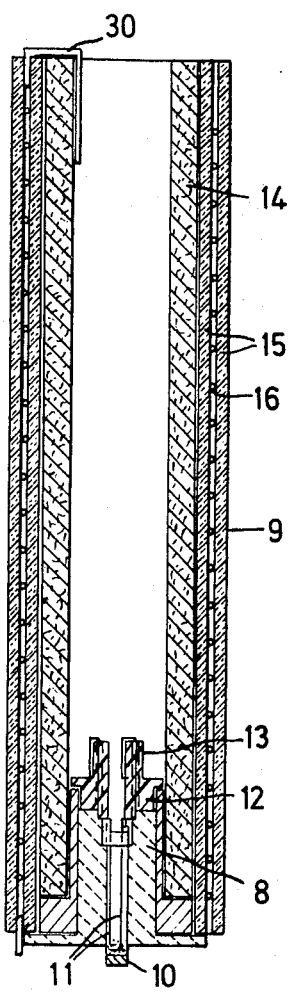

23 Claims, 4 Drawing Figures 3,657,094

DEVICE FOR MEASURING OXYGEN CONCENTRATION IN A METALLIC BATH

The present invention relates to a device for electro-chemically measuring oxygen concentration in a metallic bath, and is of interest in particular in the case where the metallic bath is treated industrially and is constituted of pig iron or steel.

Electro-chemical measurement of oxygen concentration in a metallic bath usually comprises introducing two suitable electrodes into the bath, and measuring the potential difference between these two electrodes, making it possible to deduce the content in oxygen of the bath according to a well known method. The two electrodes customarily used for effecting this measurement are generally, on the one hand, an elongate bulb of small diameter, in the interior of which a known partial pressure of oxygen is maintained, and on the other hand, a conductive rod; these two electrodes are immersed in the metallic bath.

All these known apparatuses are composed of a fairly large number of pieces whence arises their complexity and bulk. Another disadvantage resides in the fact that it has not been possible to change the electrodes rapidly, in view of the complexity of the apparatus.

To overcome these disadvantages, the applicant has already recommended a measurement device comprising two electrodes, one of which is constituted in the customary manner of a rod of a conductive material such as for instance iron, the other comprising:

a tube of quartz or of refractory material closed at one of its ends by a pastille or a cement of refractory oxide having the property that it is an ionic conductor;

a thermo-couple arranged within the tube;

a layer of powdery material deposited at the bottom of the tube to ensure good contact between the thermo-couple junction and the internal wall of the end of the tube; and a device allowing constant partial pressure of oxygen to be maintained at the bottom of the tube.

With the object of simplification, the applicant has conceived the idea of combining these two electrodes to form a single measurement cell which with a holder forms a probe which is very easy to handle, the inter-changeability of the various pieces of which it is formed being ensured by the standardization of their shapes and dimensions.

The invention provides a probe for measuring oxygen concentration in a metallic bath, the probe comprising a holder, and a measurement cell detachably connected to the holder; the holder comprising a central tube, an intermediate tube, and an external tube, each tube being of electrically conducting material, and electrically insulating spacers between the tubes; the measurement cell comprising a heat resistant sheath which receives the external tube of the holder; a housing rigid with this sheath, the housing having a cavity which extends therethrough and which receives the central tube of the holder; a first electrode, a solid electrolyte, a thermo-couple, and a layer of powdery material providing thermal contact between the thermo-couple junction and the housing; a second electrode; and three contact elements electrically connected to the two leads of the thermo-couple and the second electrode, respectively, and making respective electrical contact with the central tube, the intermediate tube, and the external tube, when the measurement cell is connected to the holder.

This probe of compact form and capable of allowing pieces to be renewed and to be changed as rapidly as for a pyrometric rod, that is to say with a delay of the order of 10 sec.

This probe moreover allows measurement of the temperature of the bath to take place at the place of probing (by virtue of the thermo-couple in the first electrode).

Figure 1:
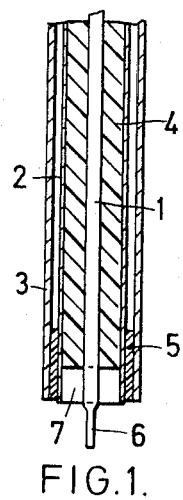
Figure 2:
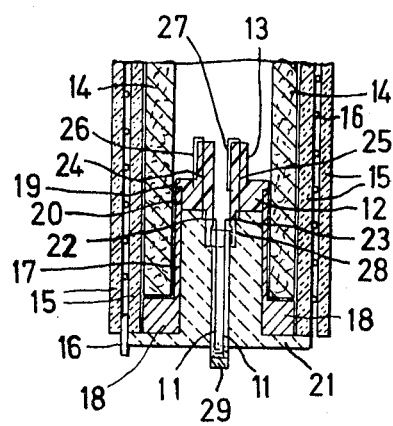

In accordance with FIGS. 1, 2 and 3 in the drawings by way of example and not restrictively, the device forming the subject of the invention is essentially characterized in that it comprises:

FIG. 1 shows a cell holder including three co-axial tubes 1, 2, 3, which are electrically conductive but which are insulated electrically from one another by suitable materials arranged between the tubes 1 and 2 and 5 arranged between the tubes 2 and 3. These tubes are each separately connected electrically at one end to an installation for analysis of the measurements and at the other end to the measurement cell itself. The central tube 1 is hollow and can supply to the measurement cell a reference gas having a known partial pressure of oxygen. The central tube 1 ends in a narrow neck 6 extending beyond the ends of the tubes 2, 3, to allow easy and firm fitting of this end of the tube 1 in a housing provided for this purpose in the measurement cell, and to allow effective sweeping of the solid electrolyte in the measurement cell. There is a free space between the tubes 1 and 2 near the neck 6 of the tube 1, without interposition of insulating material, so as to define an adequate cavity 7 between these two tubes to receive as a friction fit a suitable socket on the measurement cell.

The measurement cell itself (FIGS. 2 and 3) comprises a central housing or cup 8 and a protective peripheral sheath or envelope 9. The cup 8 holds an electrode which comprises a hollow tube, a solid electrolyte 10 closing one end of the hollow tube, a thermo-couple 11, and a layer of powdery material deposited at the bottom of the cup 8 and ensuring good contact between the junction of the thermo-couple and the internal wall of the end of the cup 8. The cup has a collar 12 having a socket 13 which is a friction fit in the sleeve 7 (FIG. 1) and which receives the neck 6 of the central tube 1 for supplying the reference gas. The peripheral envelope 9 comprises an inner tube 14 of combustible material, such as cardboard, which slidingly receives the external tube 3 (FIG. 1) of the cell holder, and an outer tube 15 composed of material which is resistant to high temperatures and inert in relation to the metallic bath to be studied. A conductive element 16 constitutes the other measurement electrode and is embedded in the outer tube 15. The length of the electrode 16 and the hollow tube is such that only a small portion of these projects from the measurement cell and is exposed to contact with the metallic bath during the introduction of the end of the cell into the metallic bath.

The partial oxygen pressure used as a reference may be obtained by supplying the central tube 1 with a suitable reference gas, i.e. any mixture containing or releasing oxygen when at high temperature, such as air, CO, $CO_2$, single or in mixture. However, this given partial pressure of oxygen is preferably obtained by placing at the bottom of the cup 8 a mixture of a metal and its oxide (for instance $Cr + Cr_2O_3$, $Ni + NiO$, $Mn + MnO$) both being finely powdered. This makes it possible to dispense with auxiliary gas supply devices and also serves as the powder intended to improve contact between the thermo-couple junction and the end of the cup.

The three tubes 1, 2, 3 are advantageously electrically insulated from one another by means of materials 4, 5 which have, moreover, good thermal refractory capacity.

The neck 6 of the hollow central tube 1 is advantageously in the form of a very fine nozzle of a material which is resistant to high temperatures and does not oxide at these temperatures. This neck may for instance be a hollow needle of stainless steel, of tantalum, or of other refractory metallic material.

A constructional detail of the cell is a refractory cement 21 occupying the volume between the solid electrolyte 10 and a sleeve 17 fitted in the cardboard tube 14. The cement 21 advantageously extends across a flange 18 on the sleeve 17 and across the end of the external tube 15 up to the electrode 16; this has the effect of strengthening the rigid connection of the central cup 8 and its protective envelope 9.

The metallic electrode 16 adapted to be put in contact on the one hand with the metallic bath and on the other hand with the external tube 3 of the cell holder, is advantageously soldered, at 30, in the interior of the protective envelope 9. This electrode may be constituted of one or more rods or of a wire mesh.

The collar 12 on the central cup 8 of the measurement cell is advantageously constituted of a material which is yieldable and electrically insulating, such as a plastics material or some other suitable polymer.

Figure 4:
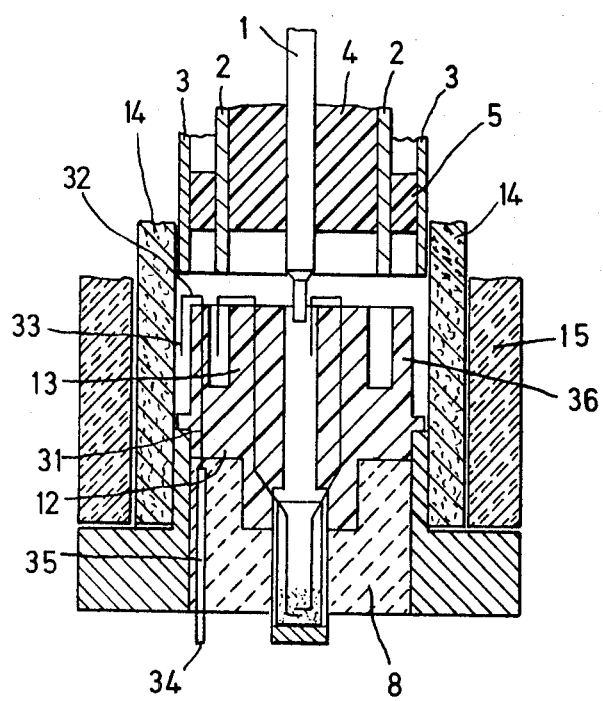

FIG. 4 shows an alternative construction of the cell. Here the second electrode 16 is replaced by an electrode 34 in the interior of the central cup. In this case the collar 12 has a cylindrical bearing rim 36 surrounding the socket 13, the external diameter of this rim is such that the tube 3 fits on it, the insulation 5 between the tubes 2 and 3 having been machined out. The rim 36 supports a wire 31 connected to the second electrode 34. The free end 33 of the wire is bent at 32 against the external wall of the rim 36 so as to come into electrical contact with the tube 3. The end of the wire 31 passes through the collar 12 and is connected to a metallic wire 35, passing through the refractory mass of the central cup 8.

This embodiment allows considerable constructional simplification of the tube 15 by eliminating the wire 16.

The second electrode (16 or 34) is preferably constituted of a metal which is not attacked by the metallic bath to be studied, for instance Pt encased in quartz, W, Mo, a stainless steel, or a cermet.

FIG. 4 shows the lower end of the cell holder exactly facing the cell. It can easily be seen how the fitting of the cell to the cell holder enables the engagement of the three electrical contacts.

It has been found advantageous for one or both of the wires of the thermo-couple 11 to be provided with a thin envelope of refractory, electrically-insulating material, which envelope may for instance be a capillary tube of quartz, zirconium or aluminium.

With the aim of ensuring greater rigidity and improved contact of the wires of the thermo-couple 11 with the conductive tubes 1, 2 of the cell holder, the ends 22, 23 of these wires are advantageously connected to respective copper wires 24, 25 passing through the portions 19 (FIGS. 2 and 3) or 13 (FIG. 4) of the collar 12. The respective free ends 26, 27 of the wires 24, 25 bent down respectively along the exterior and the interior of the socket 13 to ensure contact with the tubes 2, 1 respectively during the fitting of the measurement cell to the cell holder.

The solid electrolyte disc or cement plug 10 is advantageously held at one end of a quartz tube, the other end of which is held by an interference fit in the lower end 28 of the collar 12. The disc is of a refractory oxide having the property of being an ionic conductor such as zirconium oxide ($ZrO_2$) stabilized with lime, spinel, aluminium, or magnesium. This disc may very advantageously be fitted in the following manner in the one end of the tube.

The material from which the disc is formed is in the form of a powder with granulometry less than 70 microns.

This powder is compressed without a binder at a pressure of approximately 4 metric tons per $cm^2$. One thus obtains a substantially uniform cake the thickness of which should preferably be 2 mm to 4 mm according to the quantity of powder used.

The end of a tube of quartz, or of refractory material is then pressed in the cake, preferably with rotation of the tube, to cut out a disc in the manner of a punch. The bottom of the tube with this disc seated in it, is then subjected for a very short period (a few seconds) to the action of a flame (for instance from a blow pipe) the temperature of which is sufficiently high to start the softening of the tube material.

Contact between the internal wall of the end of the tube and the thermo-couple junction is improved by introducing at the bottom of the tube a powdery material which may advantageously be platinum or zirconium, having a granulometry of less than 0.4 mm. Moreover, this powder may be fritted, for instance by means of a blow pipe, in such a manner as to make it cohere but without thereby impairing its porosity, which has the advantage of making the entire device easy to transport; the storage of the cells is accordingly greatly facilitated.

It should be mentioned here that this powder can be replaced by a powdery mixture of a metal and its oxide, which apart from improving the contact between the thermo-couple and the wall of the tube, makes it possible to obtain a determined partial pressure of $O_2$ in the bottom of the tube.

The end of the quartz tube with its disc, and possibly the end of the second electrode (16, 34) is advantageously provided with a cap of thin metal sheet of approximately 0.10 mm thickness, intended to protect this end during the introduction of the measurement cell into the slag or into the bath.

This metal cap may either form a capping directly for the quartz tube and the disc or it may provide a capping for these and the second electrode or again, preferably, it may cap the quartz tube and the disc while itself constituting the end of the second electrode.

In order to undertake a measurement by means of the apparatus described above, the measurement cell is fitted on the cell holder, to constitute a quite compact unit which is easy to introduce into, and to withdraw from, the metallic bath, which may have the slag floating on it. If the end of the quartz tube is provided with a protective cap it is constituted of a sheet which is sufficiently thin to melt rapidly when it is in contact with the metallic bath. This protection is particularly useful when the slag covering the metallic bath is not very fluid and is comparatively thick.

After fitting the measurement cell to the cell holder, the holder is connected up to the installation for analyzing with measurements, and the probe is immersed in the metallic bath. The inlet for the reference gas is then opened, the gas having a known partial pressure of oxygen, and the gas flow is maintained to ensure adequate sweeping of the quartz tube. The required measurement of the oxygen concentration in the bath is then carried out at thermal equilibrium in the known way. (In the case where use is made of a metal/ oxide mixture, the supply of reference gas is obviously omitted).

When the measurement cell is to be replaced, it is sufficient to disconnect the cell from the cell holder, and to replace this used cell by a fresh one which is connected to the cell holder. One then has a probe which is ready to be used again to carry out the desired measurement. This facility of replacement of the measurement cell constitutes a great advantage of the device, since it makes it possible to change the measurement cell with great rapidity, in effect as rapidly as the time needed for the replacement of a pyrometric blow pipe, which is approximately 10 seconds.

It should be noted that the cardboard tube 14 of the measurement cell also plays the part of a warning device if the outer tube 15 fails, since as soon as the tube 15 is breaching by the metal bath, the cardboard tube 14 visibly reacts with the metal bath and warns the user that continued immersion could cause serious damage to the probe to the point of making it unusable. This for instance would be the case if the metallic bath came into contact with the conductive tubes 1, 2, and 3.

We claim:

1. A probe for measuring oxygen concentration in a metallic bath, the probe comprising:
   A. a holder, and
   B. a measurement cell detachably connected to the holder; the holder comprising:
   a. a central tube,
   b. an intermediate tube, and
   c. an external tube each tube being of electrically conducting material; and
   d. electrically insulating spacers between said tubes; the measurement cell comprising:
   a. a heat resistant sheath which receives said external tube of the holder;
   b. a housing within the sheath having a cavity which extends therethrough and which receives said central tube of the holder;
   c. a first electrode;
   d. a solid electrolyte;
   e. a thermo-couple having a junction and two leads from the junction;
   f. a layer of powdery material providing thermal contact between said junction and said housing;
   g. a second electrode;

h. a first contact element electrically connected to one of said leads from said thermo-couple junction, said first contact element making electrical contact with said central tube when said measurement cell is connected to said holder;

i. a second contact element electrically connected to the other of said leads from said thermo-couple junction, said second contact element making electrical contact with said intermediate tube when said measurement cell is connected to said holder, and j. a third contact element electrically connected to said second electrode, said third contact element making electrical contact with said external tube when said measurement cell is connected to said holder.

2. A probe as claimed in claim 1, wherein the external tube is of steel and the central and intermediate tubes are of copper.

3. A probe as claimed in claim 1, wherein said electrically insulating spacers are of refractory material.

4. A probe as claimed in claim 1 wherein the end of the central tube which is received by said cavity is a thin nozzle of high temperature resistant material.

5. A probe as claimed in claim 4, wherein said nozzle is a hollow needle.

6. A probe as claimed in claim 5, wherein said hollow needle is of stainless steel.

7. A probe as claimed in claim 5, wherein said hollow needle is of tantalum.

8. A probe as claimed in claim 1, wherein said third contact element lies on the inner surface of the sheath.

9. A probe as claimed in claim 1, wherein said second electrode is embedded in the sheath and projects from the end of the sheath adjacent the housing.

10. A probe as claimed in claim 9, wherein said second electrode comprises at least one metal rod.

11. A probe as claimed in claim 9, wherein said second electrode comprises a metal gauze.

12. A probe as claimed in claim 1, wherein the sheath comprises an inner tube of combustible material and an outer tube of high temperature resistant material.

13. A probe as claimed in claim 1, wherein the powdery material is a mixture of a metal and its oxide.

14. A probe as claimed in claim 1, wherein the housing comprises a collar, a hollow tube within the collar, the thermo-couple being within the hollow tube, a sleeve, an external flange at one end of the sleeve, the other end of the sleeve being connected to the collar, the sheath fitting tightly on the sleeve, and refractory cement filling the space between the hollow tube and the sleeve, whereby the end of the hollow tube intended to come into contact with the metallic bath during the measurement operation projects by only a small amount.

15. A probe as claimed in claim 1, wherein the housing has a rim which is a friction fit between the intermediate and external tubes.

16. A probe as claimed in claim 15, wherein said third contact element lies along the outer wall of the rim.

17. A probe as claimed in claim 1, wherein at least the part of the housing adjacent the tubes of the holder is of a flexible electrically insulating material.

18. A probe as claimed in claim 14, wherein said refractory cement extends across the flange of the sleeve and is in contact with the sheath.

19. A probe as claimed in claim 1, wherein the housing includes a hollow plug portion which fits between the central and intermediate tubes of the holder, said first contact element lying along the inner surface of the plug portion, and said second contact element lying along the outer surface of the plug portion.

20. A probe as claimed in claim 1, wherein a quartz tube is received in a friction fit in the housing, one end of the tube projecting from the housing, and said solid electrolyte closing said one end of the tube.

21. A probe as claimed in claim 20, wherein said solid electrolyte is a plug of compressed refractory oxide powder.

22. A probe as claimed in claim 1 wherein at least the solid electrolyte is covered with a thin metallic cap.

23. A probe as claimed in claim 1, wherein the second electrode is in the form of a member shielding the first electrode.

* * * * *